(12) United States Patent
Egozy et al.

(10) Patent No.: US 6,482,087 B1
(45) Date of Patent: Nov. 19, 2002

(54) METHOD AND APPARATUS FOR FACILITATING GROUP MUSICAL INTERACTION OVER A NETWORK

(75) Inventors: Eran Egozy; Dan Schmidt, both of Cambridge; Alexander Rigopulos, Arlington, all of MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 0 days.

(21) Appl. No.: 09/858,179

(22) Filed: May 14, 2001

(51) Int. Cl.⁷ ............................. A63F 13/00; G10H 7/00
(52) U.S. Cl. ............................. 463/7; 463/42; 84/645
(58) Field of Search ................ 463/7, 1, 42; 84/470 R, 84/477 R, 600, 610, 645

(56) References Cited

U.S. PATENT DOCUMENTS

| | | | | |
|---|---|---|---|---|
| 5,054,360 A | * | 10/1991 | Lisle et al. | 84/645 |
| 5,117,726 A | * | 6/1992 | Lisle et al. | 84/608 |
| 5,393,926 A | * | 2/1995 | Johnson | 84/610 |
| 5,521,324 A | * | 5/1996 | Dannenberg et al. | 84/612 |
| 5,689,641 A | * | 11/1997 | Ludwig et al. | 395/200.02 |
| 5,852,251 A | * | 12/1998 | Su et al. | 84/645 |
| 5,916,302 A | * | 6/1999 | Dunn et al. | 709/204 |

OTHER PUBLICATIONS

Moller, et al., "The Distributed Real–Time Groove Network," *http://ctdnet.acns.nwu.edu/hugo/drgn.html*, pp. 1–6, retrieved Dec. 20, 1997.*

* cited by examiner

*Primary Examiner*—Chen-Wen Jiang
(74) *Attorney, Agent, or Firm*—Testa, Hurwitz & Thibeault, LLP

(57) ABSTRACT

A method for providing real-time musical interaction among a plurality of players connected via a network includes the steps of analyzing local player's musical performance to extract emulation data that represents the musical performance; transmitting emulation data to remote players over a network; receiving emulation data from remote players over the network; and using the emulation data to emulate the remote player's musical performance by locally generating approximations of the performances.

18 Claims, 4 Drawing Sheets

METHOD AND APPARATUS FOR FACILITATING GROUP MUSICAL INTERACTION OVER A NETWORK

FIELD OF THE INVENTION

This invention relates to electronic music systems and, more particularly, to an electronic music system by which game players interact musically with one another in real-time over a network.

BACKGROUND OF THE INVENTION

Music is a temporal medium, the organization of sound in time. Accordingly, music making is highly timing sensitive. When a musician presses a key on a piano, the musician expects the result to be immediately audible. Any delay in hearing the sound, even as brief as few milliseconds, produces a perceived sluggishness that impedes the ability of the musician to use the instrument.

Music making is also often a collaborative effort among many musicians who interact with each other. One form of musical interaction popular among non-musicians is provided by a video game genre known as "rhythm-action," which requires a player to perform phrases from a pre-recorded musical composition using the video game's input device to simulate a musical instrument. The best-known example of this genre is the BEATMANIA series of games published by Konami Co., Ltd. of Japan. An example of the game environment provided by BEATMANIA is shown in FIG. 1. In this series of games the notes in musical phrases are graphically displayed to the player as a series of visual markers 104 spaced along one or more timelines 110, 120, 130, 140; each marker 104 corresponds to one note in the phrase. In the environment shown in FIG. 1 the visual markers move from the top of the display to the bottom of the display. As each marker 104 on the scrolling timelines passes a graphical cursor 108 displayed along this timeline, the player must simultaneously press a button on the input device corresponding to the correct timeline to play the sound of the corresponding note at the correct time. If the player performs this action successfully for a sufficient percentage of the notes, he scores well and wins the game. If the player fails to perform this action successfully for a sufficient percentage of the notes, he scores poorly and loses the game. Two or more players may compete against each other, typically by each one attempting to play back different, parallel musical phrases from the same song simultaneously (shown in FIG. 1). The player who plays the highest percentage of notes correctly achieves the highest score and wins.

Multiplayer gaming increasingly incorporates various networking technologies that allow multiple players to compete against each other from remote physical locations via networks, and networked multiplayer gaming has become extremely popular. Unfortunately, however, the latency inherent in networked communication imposes a significant engineering and design burden on video game developers: data signals are often subject to large and unpredictable transmission delays. These transmission delays do not significantly impact turn-based games (such as chess) or other game genres in which timing sensitivity is not critical to gameplay. In action games and other "real-time" games, however, gameplay is extremely sensitive to the timing of various events, and transmission delays inherently result in inconsistencies continually forming between the local game states of the various players of a networked game. Consequently, developers of timing-sensitive networked games have had to invent various methods for gracefully performing "conflict resolution" to resolve divergent local game states.

The rhythm-action genre has a unique attribute, however, that makes traditional conflict resolution methods inapplicable. Specifically, the core activity of multiplayer rhythm-action involves simultaneous music-making, which is highly timing sensitive, by two or more players. If these two players are separated by a network, the data representing musical notes played by one player will incur transmission delays when being sent to the other player. If note data were simply transmitted to a receiving machine it would trigger corresponding audio that would sound "out of sync" to the receiving player, resulting in cacophony. One solution to this problem would be to mute the audio from remote players on the local player's machine. However, this would significantly degrade the entertainment value of the game experience by destroying musical communication between the players.

Therefore, a need exists for a system and method that enable musicians to achieve the experience of real-time musical interaction over a high-latency network, such as the Internet.

SUMMARY OF THE INVENTION

It is an object of the invention to provide a system and method that a group individuals connected to a network can use to compete with one another in real time in a rhythm-action game.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
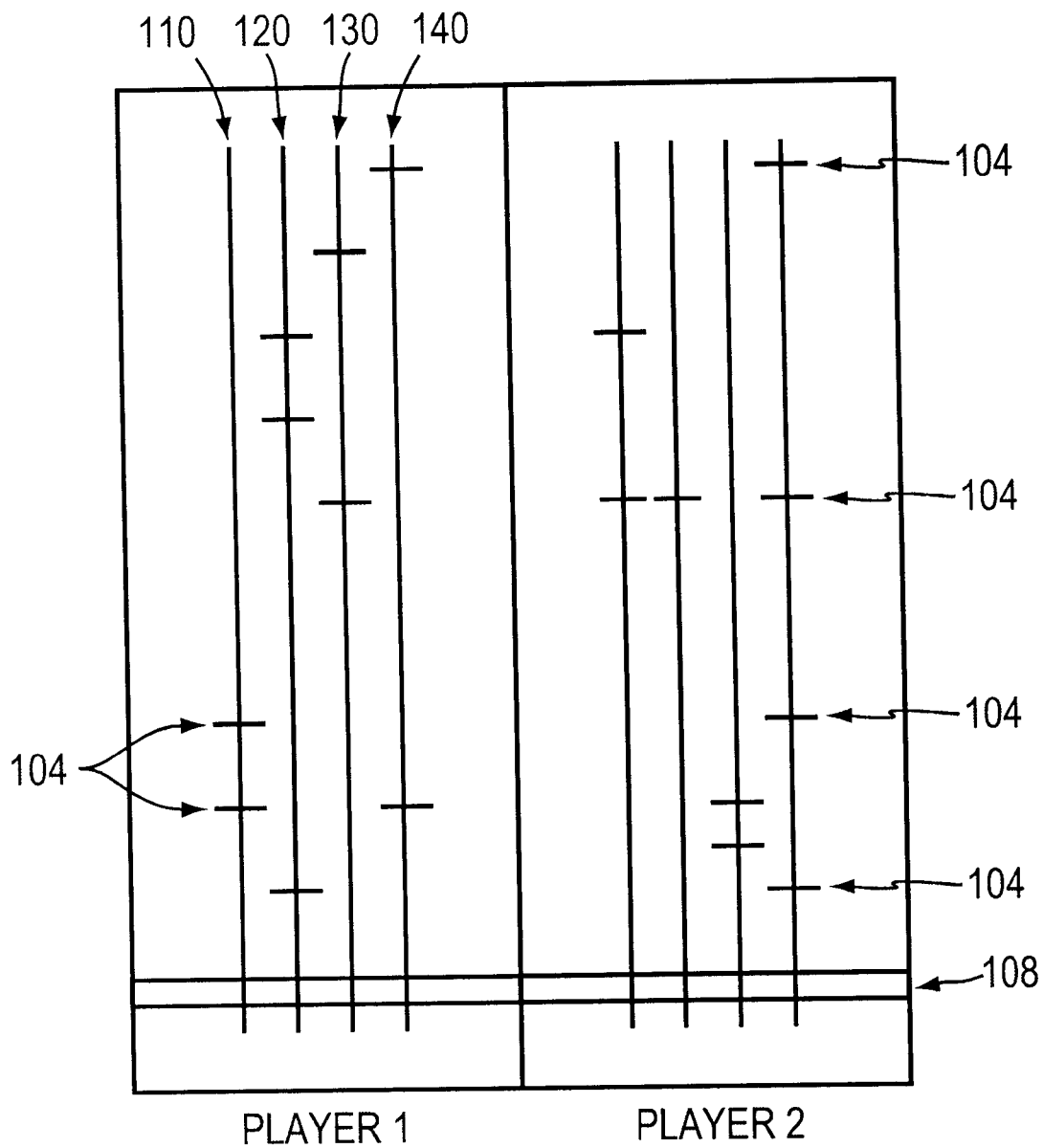
FIG. 1 shows a prior art rhythm-action game environment as it appears to players of the game.
Figure 2:
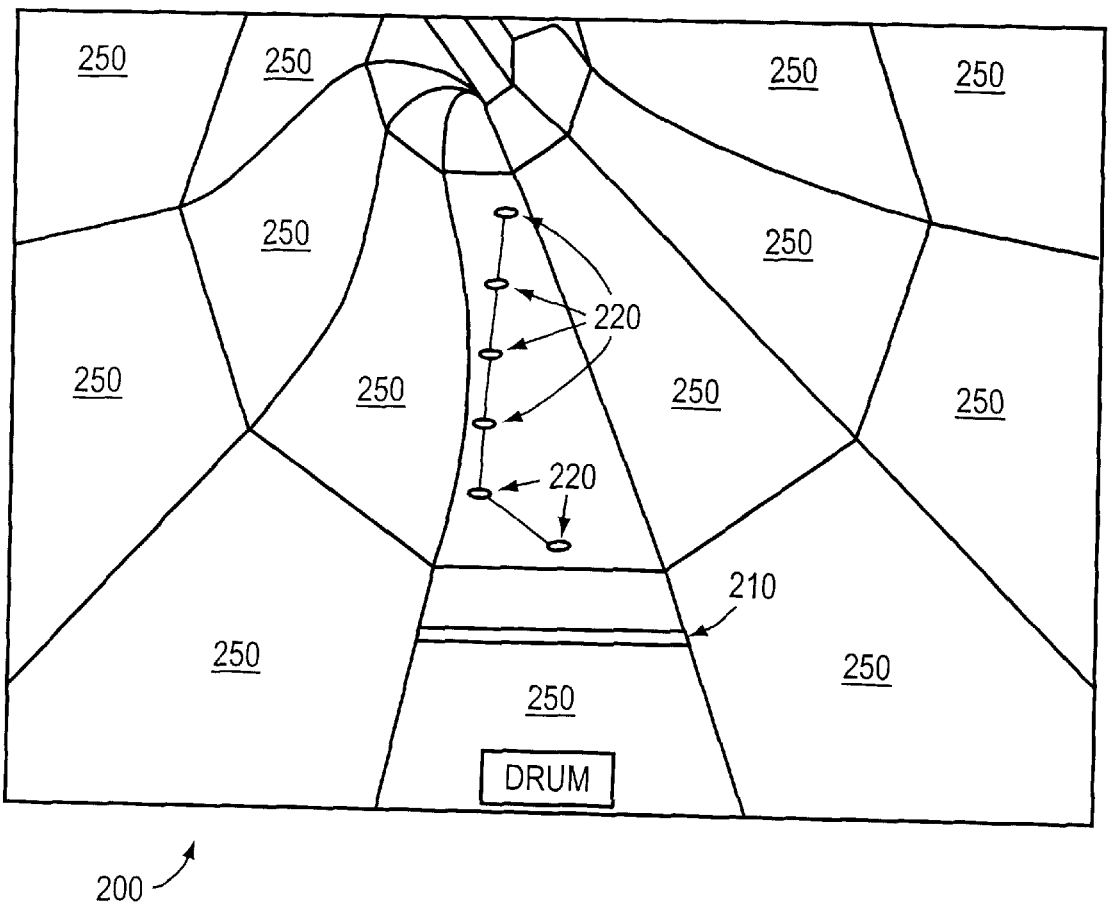
FIG. 2 depicts an improved rhythm-action game environment as it appears to players of the game.

Referring now to FIG. 2, one embodiment of an improved rhythm-action game environment is shown. The tunnel 200 graphically represents the musical composition with which the player interacts, i.e., the walls of the tunnel 200 are the active play surface. In the game environment shown in FIG. 2, the tunnel has eight walls, each of which corresponds to an instrumental track in the musical composition. The track occupying the bottom position is the active track, i.e., the track with which the player interacts. In FIG. 2, the active track is the track containing the drum portion of the musical composition. The player can use a provided input device to rotate any track to the bottom, i.e., make any track the active track. Although the game environment shown in FIG. 2 has an octagonal tunnel 200, the tunnel 200 may have any number of walls. Further, it is not necessary that the walls form a closed shape. The sides may form a road, trough, or some other complex shape that does not have its ends connected to form a closed shape.

The player continuously moves through the tunnel 200, and the player's position in the tunnel 200 is represented by a graphical cursor 210. The graphical cursor 210 may be a bar that appears to move along the active track of the tunnel 200. In other embodiments, the cursor is a ring that moves along the tunnel at a fixed distance in front of the player.

In one embodiment, the walls of the tunnel are transparent, and the "outer world" beyond the tunnel 200 is used to provide ambiance during the game; for example, the environment may provide various textures and colors to enhance the player's experiences. Video clips associated with a musical composition may be played on "billboards" (not shown) that the player passes while traveling through the tunnel 200. Ambience may also be provided by a "background" track that plays during active gameplay. It should be understood that reference to the environment includes such non-visual elements. The video clips, or other elements of the environment beyond the tunnel 200, may be displayed asynchronously of the game player's actions.

Musical events in the game environment that the player must perform are represented as graphical markers 220 spaced along the walls of the tunnel 200. FIG. 2 shows a number of markers on the drum track.

As the player moves through the tunnel 200 along the active track, the cursor 210 scrolls across one or more markers 220 that the player must "perform" by providing input, such as pressing a button, as the graphical cursor 210 passes over the marker 220. If a player provides input as the cursor 210 crosses an event marker 220, the event 220 is "caught." When the player "catches" an event, a sound represented by the event is played and the player's score is affected in a positive manner. If the player provides input when the cursor 210 is not passing over the marker 220, the player has "missed." A "miss" affects the player's score in a negative manner. In one embodiment, the "miss" causes an error sound to be played. In another embodiment, a "miss" causes the game to perform the musical event closest to the cursor 210 when the miss occurs. If the player does not provide input as the cursor 210 scrolls over an event 220, the player has "passed" that marker 220. A pass also has a negative effect on game score, but no sound is played. By successfully catching a series of events 220, a player can better his performance during game play. Also, a player successfully catching sequences of events is rewarded by the reconstruction of the musical phrases corresponding to the events.

Figure 3:
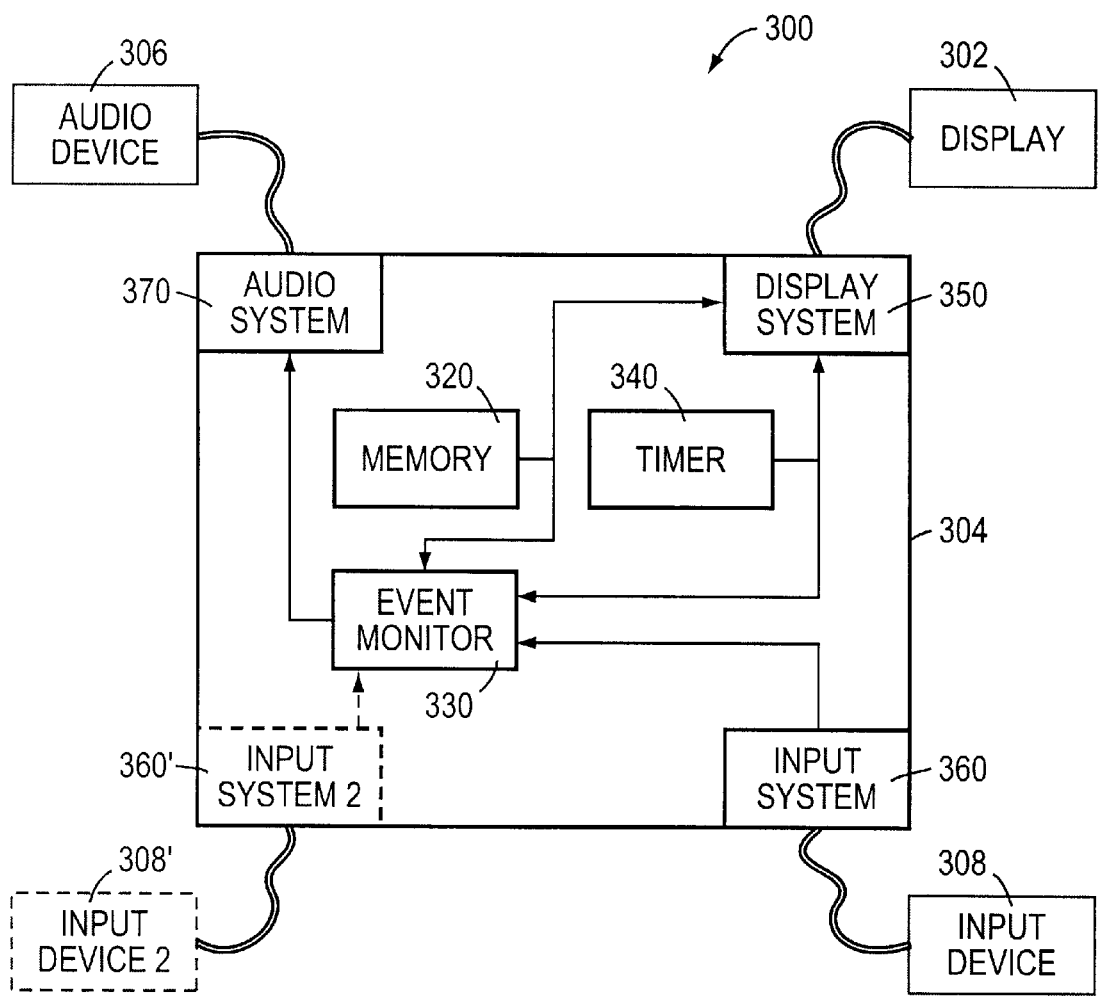
FIG. 3 is a block diagram of a system for providing a rhythm-action game.

Referring to FIG. 3, the hardware station on which the described rhythm-action game executes includes a display 302, a central processing unit 304, audio output device 306, and an input device 308.

The display 302 may be a separate display device, such as a computer monitor or television. Alternatively, the display 302 may be a unitary part of a larger unit that includes the other elements of the hardware.

The central processing unit 304 may be provided as general purpose hardware, such as a 286-based, 386-based, 486-based, Pentium-based, XEON-based, or Power PC-based personal computers. Alternatively, the central processing unit may be a network device or personal digital assistant. In one particular embodiment, the central processing unit 304 is a dedicated game system, such as: PLAYSTATION2, manufactured by Sony Corporation; DREAMCAST, manufactured by Sega Corp.; or XBOX, manufactured by Microsoft Corp. In still other embodiments the central processing unit 304 is specialized, single-purpose hardware.

Audio device 306 may be provided as speakers, an amplifier, a digital-to-audio converter, a synthesizer, or other such device. In some embodiments, the audio device 306 may be a unitary part of a larger unit that includes the other elements of the hardware. In one particular embodiment, the audio device 306 has a portion that is external to the central processing unit 304 and a portion that is internal to the central processing unit 304.

Input device 308 may be provided as an alphanumeric keyboard, a mouse, a joystick, a game pad (also called a joy pad), musical keyboard, a conventional musical instrument (e.g., a guitar, a MIDI instrument, etc.), or a "fake" musical instrument.

Still referring to FIG. 3, and in brief overview, the central processing unit 304 includes a memory element 320, an event monitor 330, a timer 340, a display system 350, an input system 360, and an audio system 370. It should be understood that the individual elements of the central processing unit 304 may be provided as hardware, software, or some combination of hardware and software. For example, in some embodiments the audio system 370, input system 360 and display system 350 are dedicated hardware or mixed hardware/firmware units that are a unitary part of the central processing unit 304, while the event monitor 330, memory element 320 and timer 340 are software or, alternatively, firmware embodied on a removable device such as a game cartridge or COMPACTFLASH card.

The memory element 320 stores data related to the musical events for the musical composition in the game. In one embodiment, memory element 320 stores at least two pieces of data for each musical event: (1) the time during the musical composition at which the musical event should occur; and (2) the actual musical content of the event, such as pitch or rhythm related data. For embodiments in which the input device 308 includes several buttons and a particular button on the input device 308 must be pressed to catch a musical event, the memory element 320 also stores for each musical event and identification of which button must be pressed on the input device 308 to catch the musical event. The memory element 320 may be provided as any element such as RAM, DRAM, SDRAM, DDR-DRAM, PROM, EPROM, or EEPROM.

The musical event data from the memory 320 is provided to both the display system 350 and the event monitor 330. The display system 350 also receives input from the timer 340. The display system 350 combines the timer values 340 and the musical event data from the memory element 320 to create the game environment, an embodiment of which is shown in FIG. 2. The display system 350 may include any visualization engine capable of creating three-dimensional environments, such as Realimation, manufactured by Realimation Ltd. of the United Kingdom or the Unreal Engine, manufactured by Epic Games.

The input system 360 receives input from the input device 308 and transmits it to the event monitor 330. The event monitor 330 receives musical event data from the memory element 320, timer values from the timer 340, and the input related information from the input system 360. The event monitor 330 compares the musical event data with the timing of input from the user to detect whether the user has caught an event, missed an event or passed on an event. When the event monitor 330 determines that a player has caught or missed an event, it immediately sends instructions to the audio system to trigger a sound. The audio system 370 receives those instructions and causes the audio devices 306 to produce sound.

For multiplayer games in which only one hardware station is used, a second input system (shown in phantom view as 360') receives input from a second input device (shown in phantom view as 308'). In this embodiment, the memory element 320 stores two sets of musical event data, one for the first player and one for the second player. Similarly, the event monitor 330 compares the input received for the first player from input system 360 against musical event data for the first player received from the memory element 320 and compares input from the second player received from input system 360' against musical event data from the second player received from the memory element 320'. In this embodiment, whenever either player catches or misses an event, an instruction is sent to the audio system 370 and audio system 370 instruct the audio device to produce the appropriate sound. Since both players are local to the hardware station, each player hears the audio for both players simultaneously.

Figure 4:
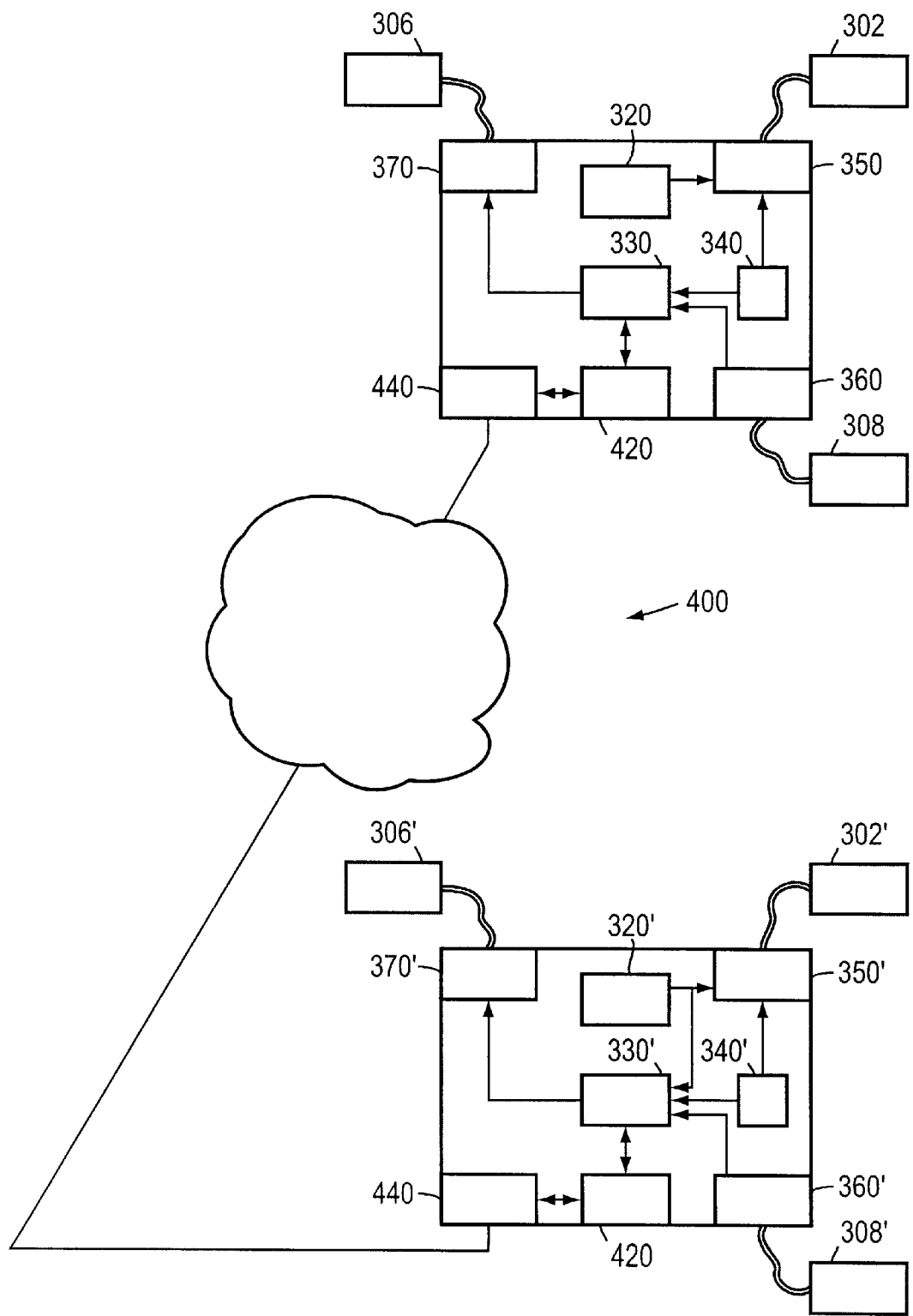
FIG. 4 is a block diagram of a networked rhythm-action game system.

Referring now to FIG. 4, an embodiment of a networked rhythm-action game systems depicts two hardware stations 300, 300'. In this embodiment players engage in competition over a network 400. The network 400 can be any kind of network, such as a local area network (LAN), a wide area network (WAN), or the Internet. The hardware stations 300 connect to the network 22 through one of a variety of connections including standard telephone lines, LAN or WAN links (e.g., T1, T3, 56 kb, X.25), broadband connections (e.g., ISDN, Frame Relay, ATM), and wireless connections. Transmission delays over the network 400 will ensure that musical events performed by one player will not be heard simultaneously by the other player. This problem is solved by the system 400 as described below.

When a networked multiplayer game session begins at the direction of one of the players, that player's hardware station (the "host" hardware station) transmits a "start" instruction to all other machines, and the game begins on all systems: each player's timer starts counting, each player's note data is displayed on his screen and each player begins attempting to play notes by pressing the button on his input device as his cursor scrolls over markers.

Gameplay on hardware station 300 is independent from game play on hardware station 300', except that each player's hardware station contains a local copy of the musical event data for all other players.

The timers on the various systems communicate with each other via the network 400 to maintain approximate synchrony using any number of the conventional means known in the art to maintain synchrony.

The systems also continually transmit game score data to each other (not shown in figure), so that each system (and player) remains aware of the game score of all other systems (and players). Similarly, this is accomplished by any number of means known in the art. Note that this data is not particularly timing sensitive, because if there is momentary disagreement between any two systems regarding the score (or similar game-related parameters), the consequences to gameplay are negligible.

As each player plays the game at their respective location, an analyzer module 420 on that player's local hardware station 30 continually extracts data from the event monitor 330 regarding the local player's performance, referred to hereafter as "emulation data". Emulation data may include any number of parameters that describe how well the player is performing. Some examples of these parameters include:

whether or not the most recent event type was a catch, miss, or pass;

a moving average of the distribution of event types (i.e. the recent ratio of catch-to-pass-to-miss); or a moving average of timing errors of miss events.

Each hardware station's analyzer module 420 continually transmits the emulation data it extracts over the network 400 to the other hardware station 300' using transceiver 440; each hardware station's event monitor 330, 330' continually receives the other hardware station's emulation data over the network 400.

The emulation data essentially contains a statistical description of a player's performance in the recent past. The event monitor 330 uses received emulation data to create a statistical approximation of the remote player's performance.

In one particular example, an incoming emulation parameter from a remote player indicates that the most recent remote event was a catch. When the local event monitor 330 reaches the next note in the local copy of the remote player's note data, it will respond accordingly by "faking" a successful catch event, triggering the appropriate sound. That is, the local event monitor 330 will perform the next musical event from the other players' musical event data, even though that event was not necessarily actually performed by the other player's event monitor 330'. (If instead the emulation parameter had indicated that the most recent remote event was a miss, no sound would be triggered.)

In another particular example, an incoming emulation parameter from a remote player indicates that during the last 8 beats, 75% of events were catches and 25% were passes. When the local event monitor 330 reaches the next note in the local copy of the remote player's note data, it will respond accordingly by randomly choosing a catch or pass event according to the specified 75:25 distribution.

In another particular example, an incoming emulation parameter from a remote player indicates that during the last 4 beats, 2 miss events occurred, with an average timing error of 50 "ticks." The local event monitor 330 will respond accordingly by randomly generating miss events at a rate of 0.5 misses-per-beat, displacing them in time from nearby notes by the specified average timing error.

The above three cases are merely examples of the many types of emulation parameters that may be used. These particular parameters are not the essence of the invention, however. Rather, the essence of the invention is that remote player performances are only emulated (rather than exactly reproduced) on each local machine.

One unusual side effect of this invention, of course, is that each local player does not hear an exact reproduction of the remote players' performances; he only hears a statistical approximation. However, these statistical approximations have two countervailing positive attributes:

1. Because they are synchronized to the local player's timer and the local copy of the remote players' note data, they are synchronous with the local player's performance.
2. While not exact reproductions, they are "close enough" to effectively communicate to the local player the essence of how well the remote players are performing musically.

In this model, delays in the transmission of the emulation data over the network do not have the intolerable side effect of causing cacophonous asynchronicity between the note streams triggering sounds on each player's local system.

In another particular example the method described above may be used with a real-time music creation system executing on the hardware station. A real-time music creation system is one with which a non-musician can produce melodic, creative music without knowledge of music theory or the ability to play an instrument or keep time. These creation systems also allow the user to create and play improvisational solos over a prerecorded background or accompaniment track without the need to strike actuators in time or otherwise physically establish and maintain the timing of the notes of the solo. Real-time music creation engines are described in U.S. Pat. Nos. 5,763,804, 5,627,335, and 6,011,212, the entire contents of which are incorporated herein by reference.

The real-time music creation engine generates signals representative of audible music by manipulating an input device. For example, an embodiments that provide a joystick as the input device, pulling the handle of the joystick back indicates that the user wants to play fewer notes over time in the given time signature, and pushing it forward is an indication that the user desires to play more notes over time. Similarly, pushing the handle of the joystick to the left indicates that the user wants to play notes of a lower pitch, and pushing it in the right direction is an indication that the user wants to play higher pitched notes. In a single-user embodiment, the input values are fed to a real-time music creation engine which includes at least a rhythm generator and a pitch generator. The rhythm generator and the pitch generator combine to form a series of notes that are rhythmically and melodically consonant with the background track.

When used in the context of the present invention, an analyzer module 420 extracts musical parameters from the input and transmits them over a network 400 to a remote hardware station. For example, the analyzer module 420 may simply transmit the input stream over a network 400 or it may extract the information into a more abstract form, such as "faster" or "lower."

The remote hardware station receives the transmitted emulation data and creates an approximation of the improvisation performed by the remote user by using the local real-time music creation system. The audio created by the local real-time music creation system is necessarily an approximation of the solo played by the remote player because the local real-time creation system is using the emulation data at a different point in time than the actual solo occurred. Even though this is the case, the local user hears a improvisational solo that has the same musical parameters (e.g. pitch and rhythm) as the solo created by the remote user at the remote hardware station [though delayed by the network latency].

Although the present invention has been described in the context of a two-player game, no limitation of the principles of the invention is intended, and the invention may be used with any number of players.

The present invention (including without limitation, the timer 340, and the event monitor 320) may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable readable programs may be implemented in any programming language, LISP, PERL, C, C++, PROLOG, or any byte code language such as JAVA. The software programs may be stored on or in one or more articles of manufacture as object code.

Having described certain embodiments of the invention, it will now become apparent to one of skill in the art that other embodiments incorporating the concepts of the invention may be used. Although the described embodiments relate to the field of rhythm-action games, the principles of the invention can extend to other areas that involve musical collaboration or competition by two or more users connected to a network. Therefore, the invention should not be limited to certain embodiments, but rather should be limited only by the spirit and scope of the following claims.

What is claimed is:

1. A method for facilitating real-time competition between players of a game, the method comprising the steps of:
    (a) receiving music performance input from a local player;
    (b) generating audio output responsive to the received input;
    (c) receiving emulation data extracted from a remote musical performance; and
    (d) generating a local approximation of the remote musical performance using the emulation data, the local approximation synchronous with the local musical performance.

2. The method of claim 1 wherein step (a) comprises receiving music performance input from a local player via a game pad.

3. The method of claim 1 wherein step (a) comprises receiving music performance input from a local player via a fake musical instrument.

4. The method of claim 1 wherein step (b) comprises playing a note to indicate a successful input.

5. The method of claim 1 wherein step (b) comprises playing an error message to indicate unsuccessful input.

6. A method for facilitating musical interaction over a network, the method comprising the steps of:
    (a) receiving emulation data representing a remote user's musical performance; and
    (b) locally generating an approximation of the remote user's musical performance using the received emulation data, the approximation synchronous with a local musical performance.

7. The method of claim 6 wherein step (a) comprises receiving emulation data, the emulation data comprising a moving average of recent remote musical performance events.

8. The method of claim 6 wherein step (a) comprises receiving emulation data, the emulation data comprising a moving average of timing deltas between recent remote musical performance events.

9. The method of claim 6 wherein step (a) comprises receiving emulation data, the emulation data comprising an identification of recent remote musical performance events.

10. The method of claim 6 further comprising extracting local emulation data representing a local musical performance.

11. A means for facilitating musical interaction over a network, comprising:
    (a) means for receiving emulation data representing a remote user's musical performance; and
    (b) means for locally generating an approximation of the remote user's musical performance using the received emulation data, the approximation synchronous with a local musical performance.

12. The means for facilitating musical interaction over a network of claim 11 further comprising means for receiving music performance input from a local player.

13. The means for facilitating musical interaction over a network of claim 12 wherein the means for receiving music performance input from a local player further comprises means for receiving music performance input from a local player via a game pad.

14. The means for facilitating musical interaction over a network of claim 12 wherein the means for receiving music performance input from a local player further comprises means for receiving music performance input from a local player via a fake musical instrument.

15. The means for facilitating musical interaction over a network of claim 11 further comprising means for extracting local emulation data representing a local musical performance.

16. The means for facilitating musical interaction over a network of claim 11 further comprising means for generating audio output responsive to the received input.

17. The means for facilitating musical interaction over a network of claim 16 wherein the means for generating audio output responsive to the received input further comprises means for playing a note to indicate a successful input.

18. The means for facilitating musical interaction over a network of claim 16 wherein the means for generating audio output responsive to the received input further comprises means for playing an error message to indicate unsuccessful input.

* * * * *